US009163580B2

(12) United States Patent
Edel et al.

(10) Patent No.: US 9,163,580 B2
(45) Date of Patent: Oct. 20, 2015

(54) PISTON FOR AN INTERNAL COMBUSTION ENGINE AND METHOD FOR ITS PRODUCTION

(71) Applicant: MAHLE International GmbH, Stuttgart (DE)

(72) Inventors: Helmut Edel, Rottweil (DE); Andreas Seeger-Van Nie, Winterbach (DE); Volker Weisse, Stuttgart (DE); Achim Fedyna, Westhausen (DE); Christian Peschke, Stuttgart (DE); Rainer Scharp, Vaihingen (DE)

(73) Assignee: MAHLE International GmbH, Stuttgart (DE)

( * ) Notice: Subject to any disclaimer, the term of this patent is extended or adjusted under 35 U.S.C. 154(b) by 64 days.

(21) Appl. No.: 14/195,921

(22) Filed: Mar. 4, 2014

(65) Prior Publication Data

US 2014/0190443 A1 Jul. 10, 2014

Related U.S. Application Data

(63) Continuation of application No. 13/066,561, filed on Apr. 18, 2011.

(30) Foreign Application Priority Data

Mar. 4, 2011 (DE) ........................ 10 2011 013 143

(51) Int. Cl.
*F16J 1/04* (2006.01)
*F01B 31/08* (2006.01)
(Continued)

(52) U.S. Cl.
CPC . *F02F 3/00* (2013.01); *F02F 3/003* (2013.01); *F02F 3/22* (2013.01); *F05C 2201/021* (2013.01); *F05C 2201/0448* (2013.01); *Y10T 29/49252* (2015.01)

(58) Field of Classification Search
CPC ....... F02F 3/22; F02F 3/003; F05C 2201/021; F05C 2201/0448; F05C 2251/042
USPC .................. 123/193.6; 92/186, 222, 231, 260
See application file for complete search history.

(56) References Cited

U.S. PATENT DOCUMENTS 4,651,631 A 3/1987 Avezou
6,401,680 B1 6/2002 Zhu et al.
(Continued)

FOREIGN PATENT DOCUMENTS

DE 10 2007 005 268 A1 8/2007
DE 10 2008 035 697 A1 2/2010
(Continued)

OTHER PUBLICATIONS

International Search Report of PCT/DE2012/000231, Oct. 9, 2012.
(Continued)

*Primary Examiner* — Lindsay Low
*Assistant Examiner* — Syed O Hasan
(74) *Attorney, Agent, or Firm* — Collard & Roe, P.C.

(57) ABSTRACT

A piston for an internal combustion engine, having a piston base body, a piston ring element having at least an inner region of a piston crown, and a piston skirt. The piston is provided with pin bosses having pin bores and the ring element has at least an outer region of a piston crown having a circumferential top land and a circumferential ring belt provided with ring grooves. The piston base body and piston ring element are joined together by way of corresponding, conical joining surfaces configured on them.

8 Claims, 3 Drawing Sheets

(51) Int. Cl.

| | |
|---|---|
| ***F16J 1/00*** | (2006.01) |
| ***F02F 3/00*** | (2006.01) |
| ***F02F 3/22*** | (2006.01) |

(56) References Cited

U.S. PATENT DOCUMENTS

| | | | |
|---|---|---|---|
| 6,622,613 | B1 | 9/2003 | Kortas et al. |
| 7,971,355 | B2 | 7/2011 | Scharp |
| 2009/0220820 | A1 | 9/2009 | Kolbe et al. |
| 2011/0048365 | A1 | 3/2011 | Schneider |

FOREIGN PATENT DOCUMENTS

| | | | |
|---|---|---|---|
| EP | 1 061 249 | A2 | 12/2000 |
| FR | 1 230 754 | A | 9/1960 |
| GB | 1 075 508 | A | 7/1967 |
| JP | 61-049795 | A | 3/1986 |

OTHER PUBLICATIONS

DIN EN 1563, Oct. 2005, total of 28 pages.

DIN EN 10293, Jun. 2005, total of 20 pages.

DIN EN 10267, Feb. 1998, total of 12 pages.

DIN EN 10083-1, -2, and -3, Oct. 2006, Oct. 2006 and Jan. 2007, respectively, total of 112 pages.

DIN 17 240, Jul. 1976, total of 24 pages.

DIN EN 10269, Jul. 2006, total of 44 pages.

DIN EN 10095, May 1999, total of 25 pages.

DIN EN 10295, Jan. 2003, total of 19 pages.

PISTON FOR AN INTERNAL COMBUSTION ENGINE AND METHOD FOR ITS PRODUCTION

CROSS REFERENCE TO RELATED APPLICATIONS

This application is a continuation of and Applicant claims priority under 35 U.S.C. §120 of U.S. application Ser. No. 13/066,561 filed on Apr. 18, 2011, which claims priority under 35 U.S.C. §119 from German Patent Application No. 10 2011 013 143.4 filed on Mar. 4, 2011, the disclosures of which are hereby incorporated by reference. A certified copy of priority German Patent Application No. 10 2011 013 143.4 is contained in parent U.S. application Ser. No. 13/066,561.

BACKGROUND OF THE INVENTION

1. Field of the Invention

The present invention relates to a piston for an internal combustion engine, having a piston base body and a piston ring element, whereby the piston base body has at least an inner region of a piston crown as well as a piston skirt, which is provided with pin bosses having pin bores, whereby the piston ring element has at least an outer region of a piston crown having a circumferential top land, and a circumferential ring belt provided with ring grooves. The present invention furthermore relates to a method for the production of such a piston.

2. The Prior Art

A piston of this type, as well as a method of this type, are known from DE 10 2007 005 268 A1. In this piston, the contact regions of the piston base body and of the piston ring element are structured in step shape or configured as a tongue-groove region, and the piston ring element is joined with the piston base body in non-releasable manner. In this way, the required tolerances for the joining method are adjusted, and canting of the two components is avoided.

This known design or this known method bring with them the result that a combustion chamber bowl is provided only in the piston base body, so that the bowl edge consists of the same material as the piston base body itself. In modern pistons, however, the piston crown and, in particular, the bowl edge, are subject to great mechanical and thermal stresses. For this reason, the use of correspondingly stress-withstanding steels is favored, so that in the piston of the stated type, the entire piston base body must necessarily consist of these materials. This brings with it not only high costs, but above all disadvantages in the mechanical processing during the course of production of the piston base body.

Furthermore, in the case of thermal joining methods, such as the welding method or soldering method that is preferred in the method of this type, significant inherent stresses build up, since the components shrink while they are cooling. These inherent stresses can only be reduced with difficulty in the case of axially circumferential seams such as those provided in the piston of this type, because of the shrinkage hindrance that necessarily results. For this reason, use of a ductile additional material is necessary, in order to avoid the occurrence of cracks during the joining process.

Particularly in the case of soldering methods or modern beam-welding methods, high demands are set with regard to fitting precision of the components to be joined. The gap widths of the joints between the components to be joined that are selected in these methods generally amount to less than 0.1 mm, frequently only 0.05 mm, since the beam diameter is correspondingly small in the case of modern beam-welding methods, for example. In the case of the piston of the stated type, the joining surfaces must be produced in multiple work cycles, by means of structuring the steps and their position relative to one another, thereby making great demands on the precision of the individual machining steps. This method is very complicated and therefore leads to increased production costs.

SUMMARY OF THE INVENTION

The task of the present invention thus consists in further developing a piston of the stated type or a method of the stated type in such a manner that a variable material selection is possible, while simplifying the production method.

The solution consists in a piston according to one aspect of the invention, as well as in a method according to another aspect of the invention. According to the invention, it is provided that piston base body and piston ring element are joined together by way of corresponding, conical joining surfaces configured on them.

Accordingly, the corresponding joining surfaces are configured on the piston base body and on the piston ring element in such a manner that they form surfaces disposed in conical shape. In this way, gap-free joints or joints having very close tolerances can be produced in particularly simple and cost-advantageous manner.

Centering of the two components takes place automatically, because of the conically configured joining surfaces, specifically on the basis of the axial force applied to the piston base body and piston ring element. Additional guide surfaces, guide edges, or the like, are not required.

Another significant advantage of the present invention consists in that the two components can basically be joined together in one work cycle, because of the configuration of the joining surfaces according to the invention.

The joining surfaces can be broken down into an axial surface vector and a radial surface vector. The radial surface components bring about the result that shrinkage stresses that can occur during thermal joining methods are reduced, without any problems, by means of free shrinkage of the components in the axial direction.

The piston according to the invention and the method according to the invention furthermore allow an essentially free material selection for the piston base body and the piston ring element, since the conically configured joining surfaces can be positioned on the two components in any desired manner. In particular, it is now possible, without any problems, that regions of the piston crown that are subject to particularly great thermal and/or mechanical stress, particularly the bowl edge of a combustion chamber bowl, consist of a material that is correspondingly capable of withstanding stress, but the piston base body is produced from a different material, which can be mechanically processed with particular ease and/or in particularly simple manner, for example.

Advantageous further developments are discussed below.

An advantageous further development provides that the corresponding joining surfaces have different cone angles, and the resulting gap is filled with a joining material. If the use of joining materials is desired, these can be introduced between the joining surfaces in particularly simple manner.

A circumferential cooling channel can be provided in the piston ring element, in known manner. However, the piston base body and the piston ring element can also jointly form a circumferential cooling channel, whose comparatively large volume ensures particularly effective cooling, particularly of the ring belt.

The piston base body and/or the piston ring element can have a locally thickened part in the region of the ends of the joining surfaces on the cooling channel side. In this way, a possible notch effect of the joining connection is at least clearly reduced.

If the piston crown of the piston according to the invention has a known combustion chamber bowl, it is advantageous if the bowl edge of the combustion chamber bowl is formed from a wear-resistant and/or temperature-resistant material. This can be achieved, in particularly simple manner, in that the piston ring element is produced from such a material, and the joining surfaces are positioned in such a manner that the bowl edge is part of the piston ring element, and the bowl crown is part of the piston base body.

In general, it is advantageous if the piston base body is produced from a metallic material, and the piston ring element is produced from a wear-resistant and/or temperature-resistant steel material.

Suitable joining methods are, for example, gluing, welding, or soldering. It is practical to apply an axial bracing force to the piston ring element and/or the piston base body during the joining process, in order to support centering of the components to be joined, particularly if the cone angles are different.

BRIEF DESCRIPTION OF THE DRAWINGS

Exemplary embodiments of the present invention will be explained in greater detail in the following, using the attached drawings. These show, in a schematic representation, not true to scale.

DETAILED DESCRIPTION OF THE PREFERRED EMBODIMENTS

Figure 1:
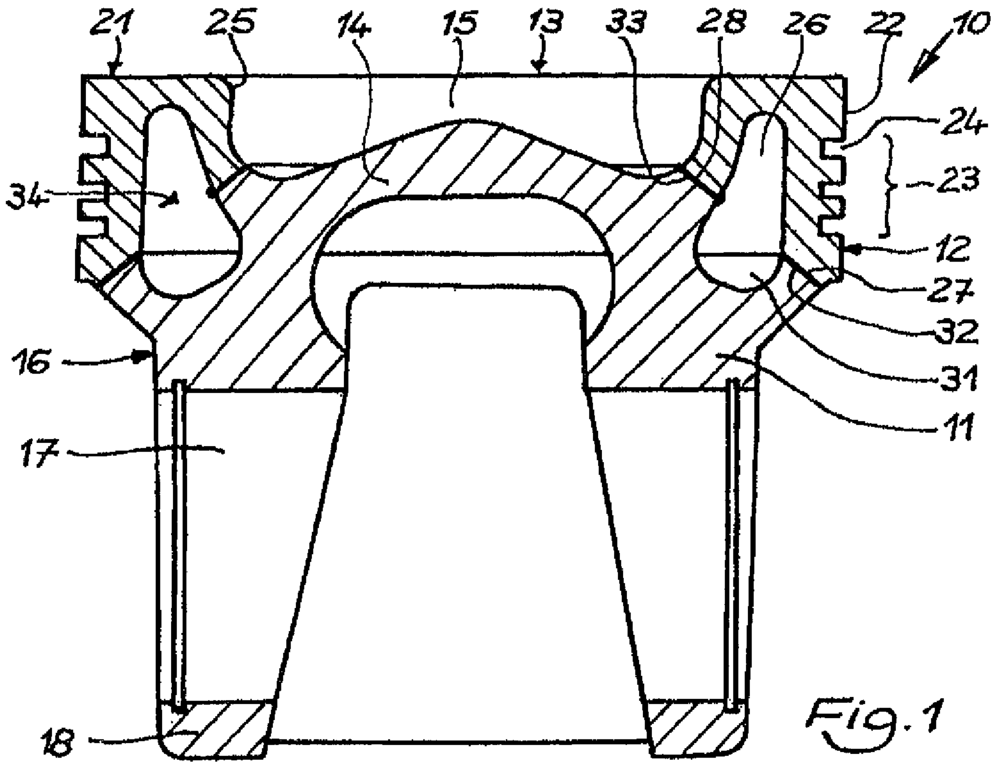
FIG. 1 a first embodiment of a piston according to the invention, in section.

FIG. 1 shows a first exemplary embodiment of a piston 10 according to the invention. The piston 10 has a piston base body 11 and a piston ring element 12. The piston base body 11 forms the inner region 14 of a piston crown 13; this inner region 14 simultaneously represents the crown of the combustion chamber bowl 15. A piston skirt 16 is tied into the underside of the piston crown 13, in known manner; this skirt has pin bosses 18 provided with pin bores 17. The piston base body 11 can be produced from an iron material or a light-metal material, for example. In this connection, casting materials as well as forging materials can be used. Typical casting materials are, for example, cast iron with spherical graphite according to DIN EN 1563, such as, for example, EN-GJS-700-2, steel casting according to DIN EN 10293, or special aluminum-silicon piston alloys.

Forging materials that can be used are, for example, AFP steels according to DIN EN 10267, tempered steels according to DIN EN 10083, or aluminum-silicon alloys that can be forged.

The piston ring element 12 forms the outer region 21 of the piston crown 13, having a circumferential top land 22 and a circumferential ring belt 23 having ring grooves 24 for piston rings (not shown). The outer region 21 of the piston crown 13 encloses the bowl edge 25 of the combustion chamber bowl 15. The piston ring element can consist of a casting or forging material, or, alternatively, of a material produced by means of powder metallurgy, preferably of a wear-resistant and/or temperature-resistant material.

For this purpose, tempered steels according to DIN EN 10083, for example, temperature-resistant and high-temperature-resistant steels, such as those according to DIN 17240 or DIN EN 10269, for example, heat-resistant steels and nickel alloys such as those according to DIN EN 10095, for example, can be used, depending on the requirements profile.

Cast iron with spherical graphite according to DIN EN 1563, steel casting material according to DIN EN 10293, or heat-resistant steel casting material according to DIN EN 10295, for example, can be used as iron casting materials.

In connection with aluminum lower parts, high-temperature-resistant aluminum piston alloys can also be used.

The piston ring element 12 furthermore has a circumferential recess 26 that extends in the direction of the piston crown 13, essentially parallel to the ring belt 23. Below the ring belt 23, a first circumferential joining surface 27 is provided, and below the bowl edge 25, a second circumferential joining surface 28 is provided. The joining surfaces 27 and 28 lie on a common conical surface.

The piston base body 11 has an outer circumferential depression 31 that is delimited by an outer circumferential joining surface 32 and an inner circumferential joining surface 33. The inner circumferential joining surface 33 simultaneously encloses the inner region 14 or crown of the combustion chamber bowl 15. The outer joining surface 32 and the inner joining surface 33 also lie on a common conical surface.

The piston base body 11 and the piston ring element 12 are joined together in that the corresponding joining surfaces 27 and 32 or 28 and 33, respectively, come to lie on one another, so that gap-free joints or joints having very close tolerances result. The piston base body 11 and the piston ring element 12 are firmly connected with one another by means of suitable joining methods, particularly gluing, soldering, or welding, along the joining surfaces 27, 32 and 28, 33, respectively. In this connection, the joining surfaces 27, 32 and 28, 33 can be connected with one another in a single work cycle, for example by means of welding. In this connection, the recess 26 of the piston ring element 12 and the depression of the piston base body 11 form a circumferential, closed cooling channel 34. Centering of piston base body 11 and piston ring element 12 occurs automatically, due to the fact that the corresponding joining surfaces 27, 32 and 28, 33 lie on corresponding conical surfaces. Centering can be supported in that piston base body 11 and piston ring element 12 are axially braced before joining.

Exemplary Embodiment

A piston base body 11, forged from 38MnVS6, is adjusted to the required strength by means of controlled cooling. Subsequently, the joining surfaces 32, 33 are produced in one work step, and the circumferential depression 31 is finished.

The piston ring element 12 is forged from the material 42CrMo4, and adjusted to the desired strength by means of a tempering process. In the same manner as for the piston base body, the joining surfaces 27, 28 are produced, in this case using the same cone angle, as is the depression.

The two parts are pre-heated and braced to one another by means of an axial force, so that the joining surfaces 27, 32 and 28, 33 come to lie on one another in centered manner. The two joints, which have now been fixed in place relative to one another, are welded to one another by means of the electron-beam welding method, without using additional material, proceeding from the outside diameter, in one work step.

Alternatively, the two joints can be firmly connected with one another, one after the other or simultaneously, proceeding from the outside diameter and the combustion chamber bowl 15, by means of a beam-welding method. The two seam roots therefore come to lie in the cooling channel.

Figure 2:
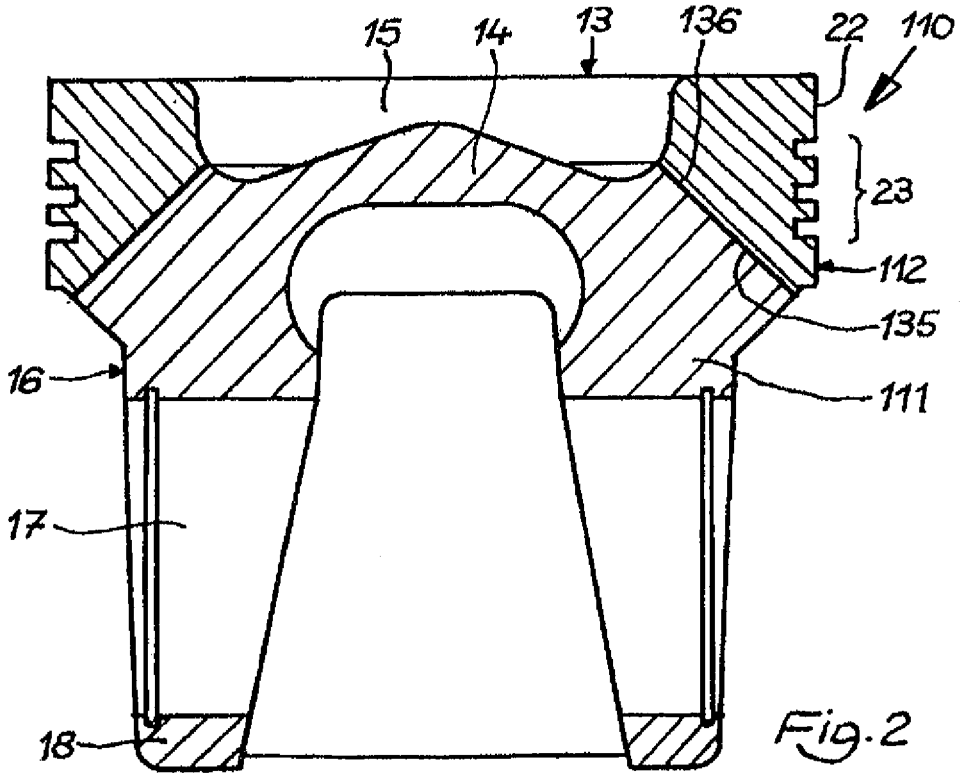
FIG. 2 another embodiment of a piston according to the invention, in section.

FIG. 2 shows another exemplary embodiment of a piston 110 according to the invention, composed of a piston base body 111 and a piston ring element 112, whereby the same components are provided with the same reference symbols. The only difference as compared with the piston 10 shown in FIG. 1 consists in that no cooling channel is provided. For this reason, the piston base body 111 has a single conical joining surface 135, and the piston ring element 112 has a single corresponding joining surface 136. The piston base body 111 and the piston ring element 112 are firmly connected with one another by means of suitable joining methods, particularly gluing, soldering, or welding, along the joining surfaces 135, 136. In this connection, the joining surfaces 135, 136 can be connected with one another in a single work cycle, for example by means of welding. In this exemplary embodiment, centering of piston base body 111 and piston ring element 112 also takes place automatically, due to the fact that the corresponding joining surfaces 135, 136 lie on corresponding conical surfaces. Centering can be supported in that piston base body 111 and piston ring element 112 are axially braced before joining. If necessary, a circumferential cooling channel can be introduced into the piston ring element 112, in known manner, as indicated with a dot-dash line in FIG. 2.

The selection of a suitable joining method depends on the materials of the piston base body 11, 111 and of the piston ring element 12, 112, in a manner known to a person skilled in the art.

When using soldering methods, the selection of a suitable solder results from the working temperature of the method selected.

Beam-supported methods, such as laser-beam welding or electron-beam welding, are possible welding methods. However, other welding methods, such as arc-supported methods, for example WIG or MAG/MIG methods, can also be used. In this connection, the use of a joining material can be desirable or even necessary.

If the use of welding additive is necessary when using a welding method, it is possible to dispose the corresponding joining surfaces 27, 28; 136 of the piston ring element 12; 112 and/or 32, 33; 135 of the piston base body 11; 111 on conical surfaces having completely different angles or angles that are different in certain regions, or on a surface in arc shape, in such a manner that an essentially wedge-shaped joint is formed (not shown). In a joint configured in such a manner, the joining material can be accommodated in particularly simple and effective manner. Particularly in the case of a piston 10 having a cooling channel 34 according to FIG. 1, it is recommended to produce the joining connection, proceeding from the cooling channel 34, in the direction of the ring belt 23 (by way of the joining surfaces 27, 32), or in the direction of the combustion chamber bowl 15 (by way of the joining surfaces 28, 33). If a welding method is selected, the seam roots can be laid on the cooling channel side, accordingly.

Figure 3:
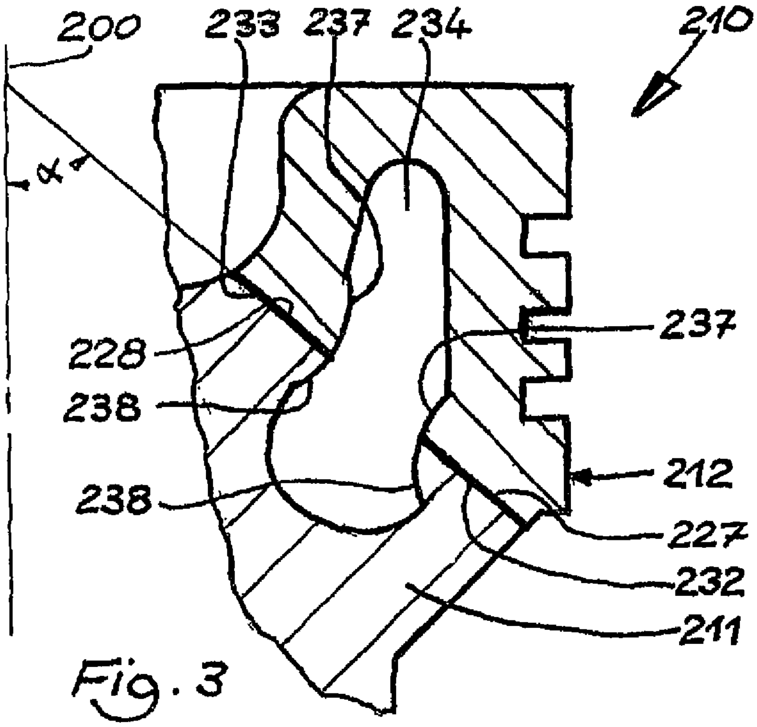
FIG. 3 a partial representation of another embodiment of a piston according to the invention, in section.

FIG. 3 shows another exemplary embodiment of a piston 210 according to the invention, having a piston base body 211 and a piston ring element 212. The piston 210 corresponds to the piston 10 according to FIG. 1, since it also has a circumferential cooling channel 234. The piston 210 is characterized in that the piston base body 211 and the piston ring element 212, in the region of the joining surfaces 227, 232 or 228, 233, respectively, on the cooling channel side, are provided with locally thickened parts (237, 238). As a result, a notch effect that might occur in the region of the joining connection is at least clearly reduced. Furthermore, this piston is characterized in that the joining surfaces 227 and 227' lie on a common plane, which is structured to be inclined at an acute angle α relative to the piston axis.

Figure 4:
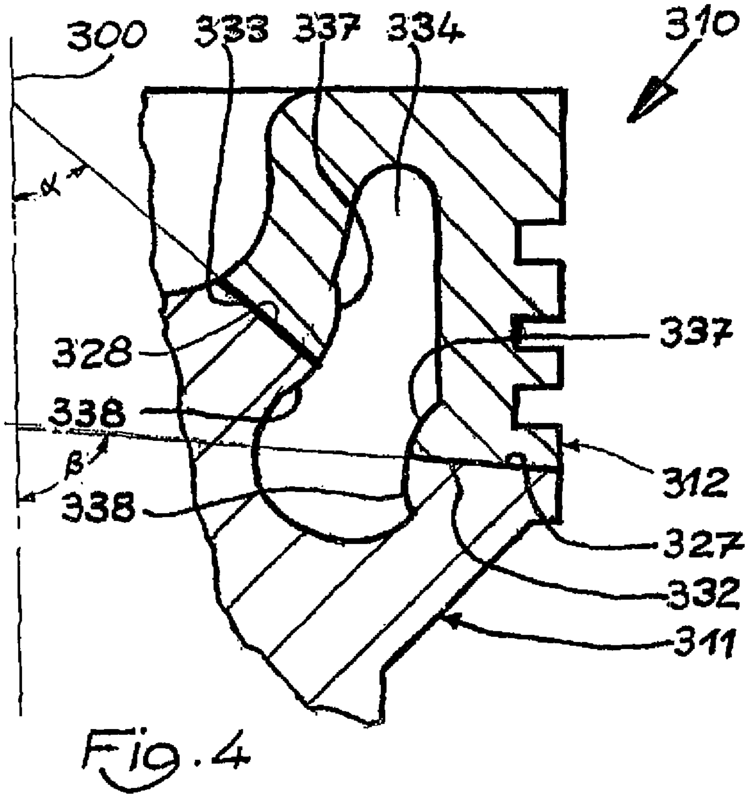
FIG. 4 another partial representation of another embodiment of a piston according to the invention, in section.

FIG. 4 shows another exemplary embodiment of the piston 310 according to the invention, in which the joining surfaces 327, 332; 328 333 do not lie on a common plane, whereby the joining surfaces 328, 333 form an acute angle α relative to the piston axis 300, and the joining surfaces 327, 332 form an acute angle β relative to the piston axis 300. The angle β is larger than the angle α. In this way, an easy self-centering effect of the two parts to be connected can be achieved.

Figure 5:
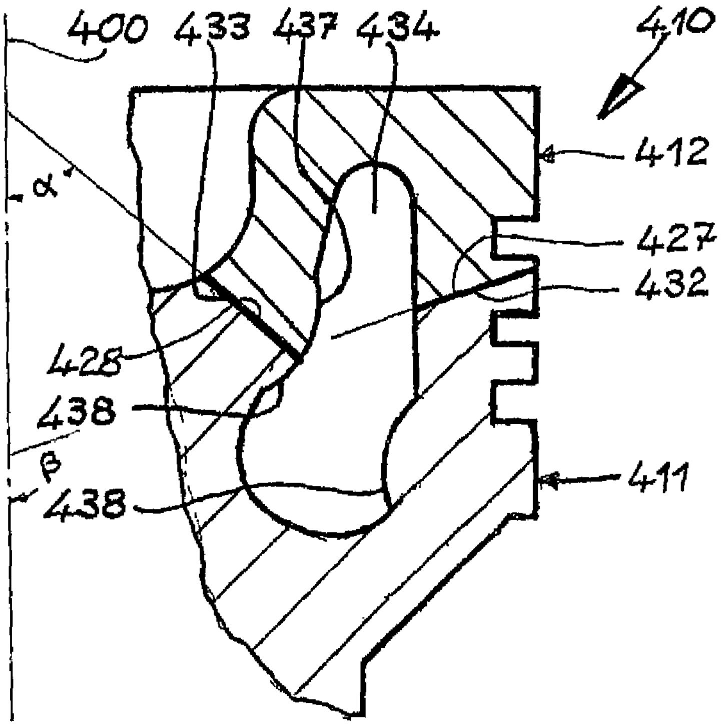
FIG. 5 another partial representation of another embodiment of a piston according to the invention.

FIG. 5 shows another exemplary embodiment of the piston 410 according to the invention, in which the joining surfaces 427, 432; 428, 433 do not lie on a common plane, whereby the joining surfaces 428, 433 form an acute angle α relative to the piston axis 400, and the joining surfaces 427, 432 form an obtuse angle β' relative to the piston axis 400. In this way, the centering effect can be optimally achieved.

What is claimed is:

1. A piston for an internal combustion engine, having a piston base body and a piston ring element, whereby the piston base body has at least an inner region of a piston crown as well as a piston skirt, which is provided with pin bosses having pin bores, whereby the piston ring element has at least an outer region of a piston crown having a circumferential top land, and a circumferential ring belt provided with ring grooves, wherein the piston crown has a combustion chamber bowl, wherein the piston base body and piston ring element jointly form a circumferential cooling channel, wherein piston base body and piston ring element are joined together by way of corresponding, conical inner and outer joining surfaces configured on them, wherein the outer joining surface of the piston ring element is located below the ring belt, wherein the inner joining surface of the piston base body encloses the inner region of the piston crown, wherein the inner joining surfaces form an acute angle α relative to a vertical piston axis, wherein the outer joining surfaces form an acute angle β relative to said vertical piston axis, and wherein β is larger than α.

2. The piston according to claim 1, wherein at least one of the piston base body and the piston ring element has a locally thickened part in the region of ends of the joining surfaces on a cooling channel side.

3. The piston according to claim 1, wherein the combustion chamber bowl has a bowl edge composed of a wear-resistant and/or temperature-resistant material.

4. The piston according to claim 1, wherein the piston base body is produced from a metallic material, and the piston ring element is produced from a wear-resistant and/or temperature-resistant material.

5. A piston for an internal combustion engine, having a piston base body and a piston ring element, whereby the piston base body has at least an inner region of a piston crown as well as a piston skirt, the piston skirt being provided with pin bosses having pin bores, wherein the piston ring element has at least an outer region of a piston crown having a circumferential top land, and a circumferential ring belt provided with ring grooves, wherein the piston crown has a combustion chamber bowl, wherein the piston base body and piston ring element jointly form a circumferential cooling channel, wherein the piston base body and piston ring element are joined together by way of corresponding, conical inner and outer joining surfaces configured on them, wherein the outer joining surface of the piston ring element is located within the ring belt, wherein the inner joining surface of the piston base body encloses the inner region of the piston crown, whereby the inner joining surfaces form an acute angle $\alpha$ relative to a vertical piston axis and wherein the outer joining surfaces form an obtuse angle $\beta'$ relative to said vertical piston axis.

6. The piston according to claim 5, wherein at least one of the piston base body and the piston ring element has a locally thickened part in a region of ends of the joining surfaces on a cooling channel side.

7. The piston according to claim 5, wherein the combustion chamber bowl has a bowl edge composed of a wear-resistant and/or temperature-resistant material.

8. The piston according to claim 5, wherein the piston base body is produced from a metallic material, and the piston ring element is produced from a wear-resistant and/or temperature-resistant material.

* * * * *